US012669956B2

(12) United States Patent
Bi et al.

(10) Patent No.: US 12,669,956 B2
(45) Date of Patent: Jun. 30, 2026

(54) MEMORY SYSTEM AND A METHOD OF OPERATING THEREOF, A MEMORY CONTROLLER AND A READABLE STORAGE MEDIUM

(71) Applicant: YANGTZE MEMORY TECHNOLOGIES CO., LTD., Wuhan (CN)

(72) Inventors: Fanya Bi, Wuhan (CN); Xing Wang, Wuhan (CN); Hua Tan, Wuhan (CN); Zhe Sun, Wuhan (CN); Bo Yu, Wuhan (CN); Guangyao Han, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 439 days.

(21) Appl. No.: 18/461,667

(22) Filed: Sep. 6, 2023

(65) Prior Publication Data
US 2024/0361953 A1     Oct. 31, 2024

(30) Foreign Application Priority Data

Apr. 28, 2023     (CN) .......................... 202310503649.4

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0656; G06F 3/0604; G06F 3/0659; G06F 3/0679
See application file for complete search history.

(56) References Cited

U.S. PATENT DOCUMENTS 10,031,699 B1     7/2018  Graniello et al.
10,101,931 B1    10/2018  Camp et al.
(Continued)

FOREIGN PATENT DOCUMENTS

CN        111145819 A      5/2020
CN        112447207 A      3/2021
(Continued)

OTHER PUBLICATIONS

Yangtze Memory Technologies Co., Ltd., "First Examination Opinion Notice," mailed Aug. 9, 2025, CN App. No. 202310503649.4, 6 p. (translation 6 p.).
(Continued)

*Primary Examiner* — Nicholas J Simonetti
(74) *Attorney, Agent, or Firm* — Conley Rose, P.C.

(57)     ABSTRACT

In an example, a memory controller is configured to: check whether a logical block address corresponding to a host read command is maintained in a write buffer; determine a level of an amount of drift corresponding to the logical block address if the logical block address is not maintained in the write buffer, where different levels of the amount of drift correspond to different read voltages; and send a read command to a non-volatile memory device according to the level of the amount of drift corresponding to the logical block address. At least two of the processes of checking whether the logical block address is maintained, determining the level of the amount of drift, or sending the read command are performed in parallel.

20 Claims, 7 Drawing Sheets

(56)     References Cited

U.S. PATENT DOCUMENTS

2019/0391759 A1*   12/2019   Kang ................. G11C 13/0004
2021/0034285 A1*    2/2021   Kim ...................... G06F 3/0652

FOREIGN PATENT DOCUMENTS

JP          2002324008  A      11/2002
JP          2004070691  A       3/2004

OTHER PUBLICATIONS

Yangtze Memory Technologies Co., Ltd., "Second Examination Opinion Notice," mailed Jan. 9, 2026, CN App. No. 202310503649. 4, 8 p. (translation 8 p.).

* cited by examiner

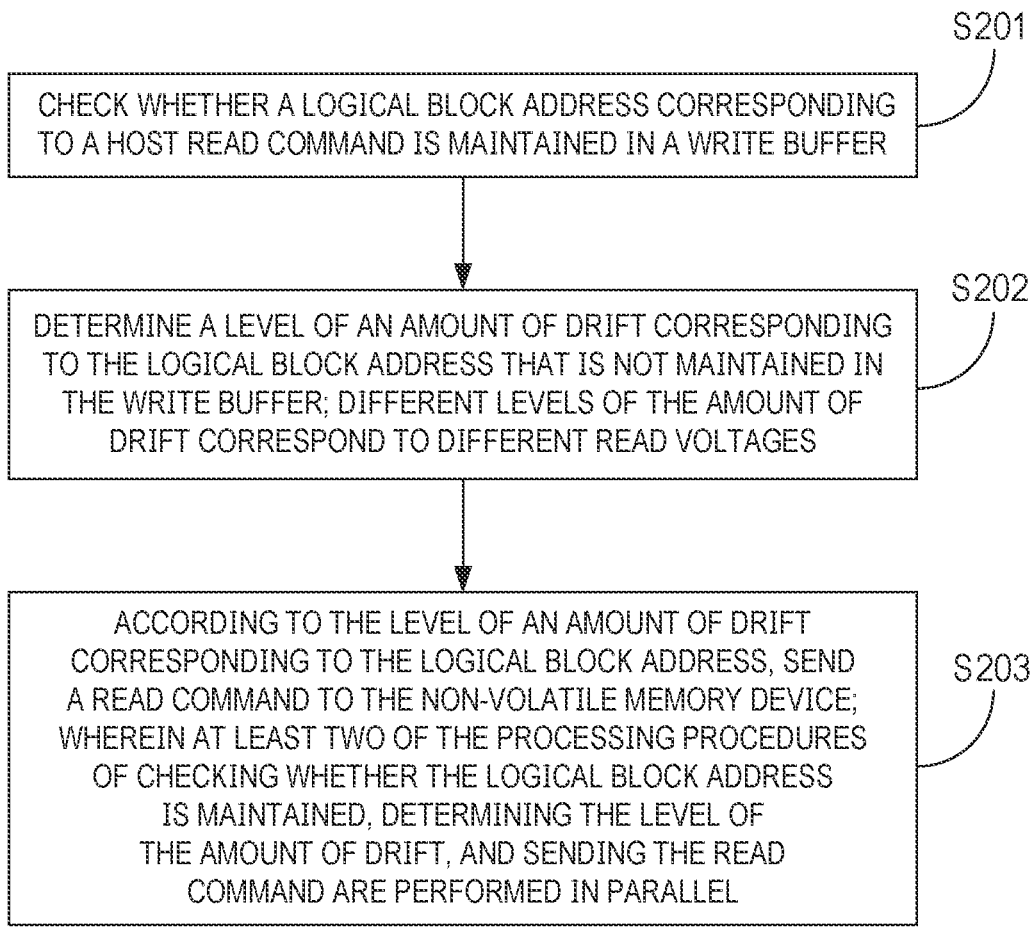

S201

CHECK WHETHER A LOGICAL BLOCK ADDRESS CORRESPONDING TO A HOST READ COMMAND IS MAINTAINED IN A WRITE BUFFER

S202

DETERMINE A LEVEL OF AN AMOUNT OF DRIFT CORRESPONDING TO THE LOGICAL BLOCK ADDRESS THAT IS NOT MAINTAINED IN THE WRITE BUFFER; DIFFERENT LEVELS OF THE AMOUNT OF DRIFT CORRESPOND TO DIFFERENT READ VOLTAGES

S203

ACCORDING TO THE LEVEL OF AN AMOUNT OF DRIFT CORRESPONDING TO THE LOGICAL BLOCK ADDRESS, SEND A READ COMMAND TO THE NON-VOLATILE MEMORY DEVICE; WHEREIN AT LEAST TWO OF THE PROCESSING PROCEDURES OF CHECKING WHETHER THE LOGICAL BLOCK ADDRESS IS MAINTAINED, DETERMINING THE LEVEL OF THE AMOUNT OF DRIFT, AND SENDING THE READ COMMAND ARE PERFORMED IN PARALLEL

Figure 3:
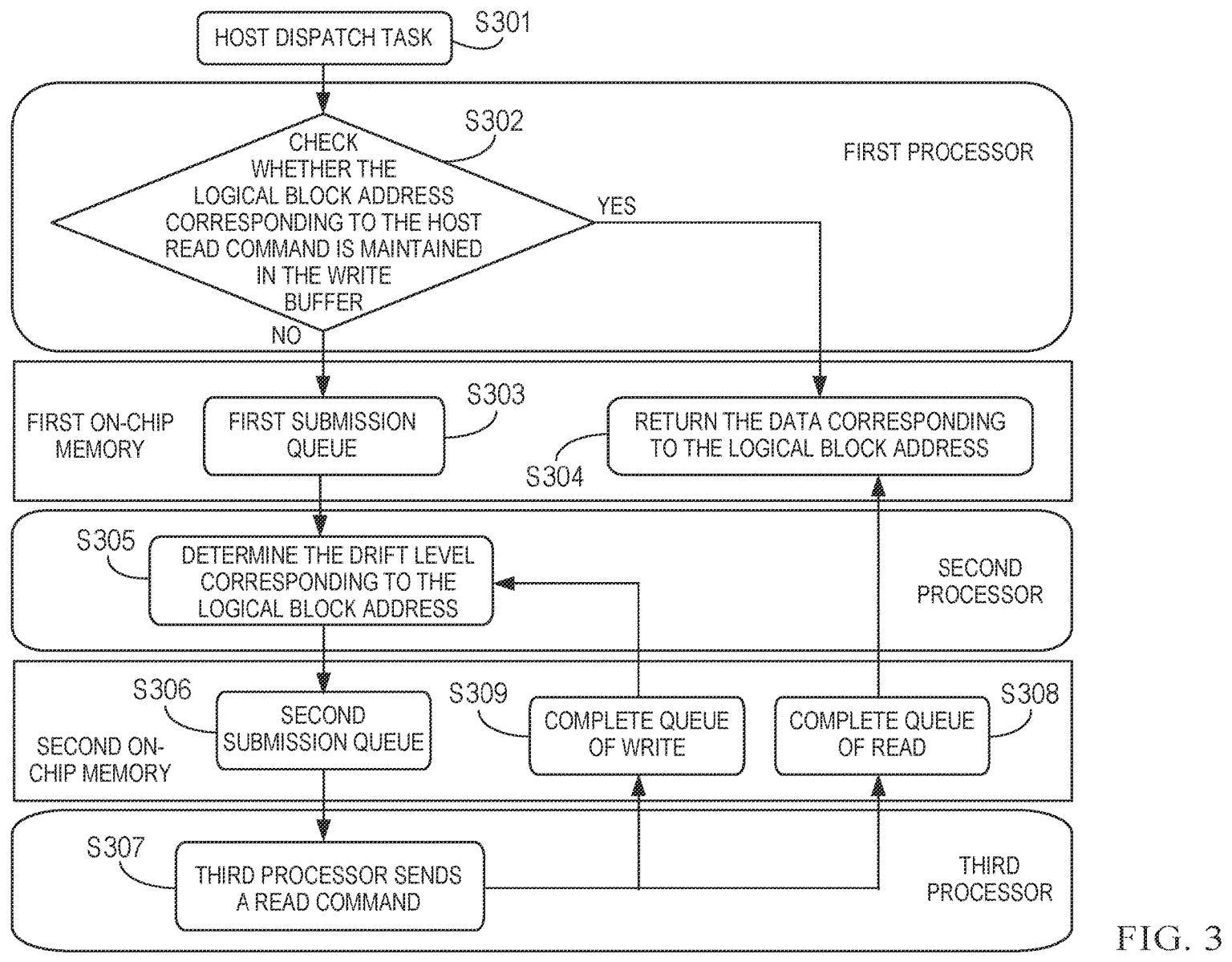

FIRST PROCESSOR

HOST DISPATCH TASK — S301

CHECK WHETHER THE LOGICAL BLOCK ADDRESS CORRESPONDING TO THE HOST READ COMMAND IS MAINTAINED IN THE WRITE BUFFER — S302

YES → RETURN THE DATA CORRESPONDING TO THE LOGICAL BLOCK ADDRESS — S304

NO

FIRST ON-CHIP MEMORY

FIRST SUBMISSION QUEUE — S303

SECOND PROCESSOR

COMPLETE QUEUE OF READ — S308

DETERMINE THE DRIFT LEVEL CORRESPONDING TO THE LOGICAL BLOCK ADDRESS — S305

COMPLETE QUEUE OF WRITE — S309

SECOND ON-CHIP MEMORY

SECOND SUBMISSION QUEUE — S306

THIRD PROCESSOR

THIRD PROCESSOR SENDS A READ COMMAND — S307

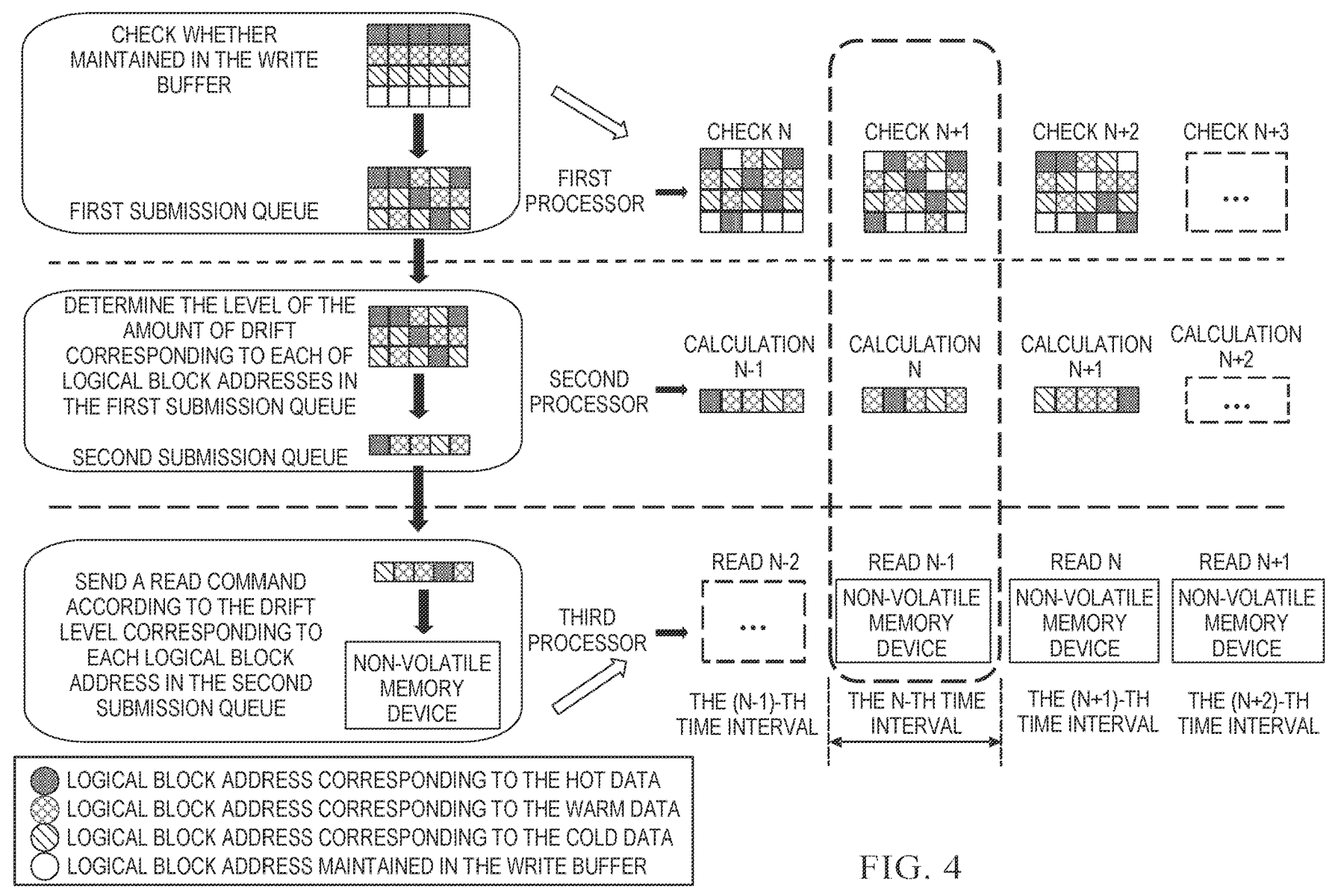

CHECK N+3

CHECK N+2

CHECK N+1

CHECK N

CHECK WHETHER MAINTAINED IN THE WRITE BUFFER

FIRST SUBMISSION QUEUE

FIRST PROCESSOR

CALCULATION N+2

CALCULATION N+1

CALCULATION N

CALCULATION N-1

DETERMINE THE LEVEL OF THE AMOUNT OF DRIFT CORRESPONDING TO EACH OF LOGICAL BLOCK ADDRESSES IN THE FIRST SUBMISSION QUEUE

SECOND SUBMISSION QUEUE

SECOND PROCESSOR

READ N+1

NON-VOLATILE MEMORY DEVICE

READ N

NON-VOLATILE MEMORY DEVICE

READ N-1

NON-VOLATILE MEMORY DEVICE

READ N-2

SEND A READ COMMAND ACCORDING TO THE DRIFT LEVEL CORRESPONDING TO EACH LOGICAL BLOCK ADDRESS IN THE SECOND SUBMISSION QUEUE

NON-VOLATILE MEMORY DEVICE

THIRD PROCESSOR

THE (N+2)-TH TIME INTERVAL

THE (N+1)-TH TIME INTERVAL

THE N-TH TIME INTERVAL

THE (N-1)-TH TIME INTERVAL

THE (N-1)-TH TIME INTERVAL

FIG. 4

LOGICAL BLOCK ADDRESS CORRESPONDING TO THE HOT DATA
LOGICAL BLOCK ADDRESS CORRESPONDING TO THE WARM DATA
LOGICAL BLOCK ADDRESS CORRESPONDING TO THE COLD DATA
LOGICAL BLOCK ADDRESS MAINTAINED IN THE WRITE BUFFER

MEMORY SYSTEM AND A METHOD OF OPERATING THEREOF, A MEMORY CONTROLLER AND A READABLE STORAGE MEDIUM

CROSS-REFERENCE TO RELATED APPLICATIONS

The present application claims priority to Chinese Patent Application No. 2023105036494, which was filed Apr. 28, 2023, is titled "MEMORY SYSTEM AND METHOD OF OPERATION THEREOF, MEMORY CONTROLLER AND READABLE STORAGE MEDIUM," and is hereby incorporated herein by reference in its entirety.

TECHNICAL FIELD

The present disclosure relates to the field of semiconductor technology, and in particular to a memory system and a method of operating thereof, a memory controller and a readable storage medium.

BACKGROUND

Threshold voltage of a memory cell of a memory drifts over time. For example, after different time periods have passed after data being written into the memory cell, amounts of drift of the threshold voltages of the memory cell are different and the read voltages of the memory cell are different. By not considering the amounts of the drift of the threshold voltage of the memory cell, performing an operation of a read command on the memory may cause the failure of the read command operation, thereby reducing the reliability of data stored in the memory.

SUMMARY

Examples of the present disclosure provide a memory system and a method of operating thereof, a memory controller and a readable storage medium.

In some examples, a technical scheme of the present disclosure is implemented as follows.

In a first aspect, an example of the present disclosure provides a memory system, the memory system includes: at least one non-volatile memory device and a memory controller coupled to the non-volatile memory device and configured to: check whether a logical block address corresponding to a host read command is maintained in a write buffer; determine a level of an amount of drift corresponding to the logical block address, if the logical block address is not maintained in the write buffer, where different levels of the amount of drift correspond to different read voltages; and send a read command to the non-volatile memory device according to the level of the amount of drift corresponding to the logical block address, wherein at least two of the processes of checking whether the logical block address is maintained, determining the level of the amount of drift, or sending the read command are performed in parallel.

In some examples, the processes of checking whether the logical block address is maintained, determining the level of the amount of drift, and sending the read command are all performed in parallel; the memory controller includes: a first processor, a second processor, a third processor, a first on-chip memory, and a second on-chip memory; wherein the first processor is configured to: check whether the logical block address corresponding to the host read command is maintained in the write buffer, and submit the logical block address to the first submission queue, if the logical block address is not maintained in the write buffer; the first on-chip memory is configured to: store the first submission queue; the second processor is configured to: determine a level of an amount of drift corresponding to each of the logical block addresses in the first submission queue, and submit the level of the amount of drift corresponding to each of the logical block addresses to a second submission queue; the second on-chip memory is configured to: store the second submission queue; the third processor is configured to: send a read command to the non-volatile memory device according to the level of the amount of drift corresponding to each of the logical block addresses in the second submission queue; wherein at a same time, the logical block addresses corresponding to the first submission queue, the second submission queue and the sending the read command respectively are different.

In some examples, the second processor is configured to: determine a level of the amount of drift corresponding to each of the logical block addresses according to the heat of the data corresponding to each of the logical block addresses in the first submission queue; the heat of the data represents a degree of length of average time difference between writing and reading of the data.

In some examples, the heat of the data includes: hot data, warm data, and cold data; the average time difference between writing and reading corresponding to the hot data, the warm data, and the cold data respectively becomes longer in sequence.

In some examples, the second processor is configured to: when the data corresponding to the logical block address is the hot data, determine that the level of the amount of drift corresponding to the logical block address is a first level of the amount of drift; when the data corresponding to the logical block address is the warm data, determine that the level of the amount of drift corresponding to the logical block address is a second level of the amount of drift; when the data corresponding to the logical block address is the cold data, determine that the level of the amount of drift corresponding to the logical block address is a third level of the amount of drift; wherein the first level of the amount of drift is less than the second level of the amount of drift, and the second level of the amount of drift is less than the third level of the amount of drift.

In some examples, the second processor is configured to: determine the ranking of the logical block addresses in the second submission queue according to the heat of the data corresponding to each of the logical block addresses in the first submission queue; wherein the higher is the heat of the data corresponding to the logical block address, the higher is the priority of the ranking of the logical block address in the second submission queue.

In some examples, the second processor is configured to: determine the heat of the data corresponding to each of the logical block addresses in the first submission queue through querying a mapping table.

In some examples, the third processor is configured to: determine a read voltage for performing an operation of a read command on the non-volatile memory device according to the level of the amount of drift corresponding to each of the logical block addresses in the second submission queue; send the read command to the non-volatile memory device according to the read voltage for performing the operation of the read command on the non-volatile memory device.

In some examples, the third processor is configured to: when the reading of the non-volatile memory device successes, submit the logical block address of the read command to a complete queue of read; and when the reading of the non-volatile memory device fails, submit the logical block address of the read command to a complete queue of write.

The second on-chip memory is further configured to: store the complete queue of read and the complete queue of write; the second processor is further configured to: redetermine the level of the amount of drift corresponding to each of the logical block addresses in the complete queue of write.

In some examples, within the n-th time interval, the first processor is configured to: perform the (n+1)-th round of checking whether the logical block address is maintained in the write buffer; the second processor is configured to: perform the n-th round of determining the level of the amount of drift corresponding to the logical block address in the first submission queue; and the third processor is configured to: perform the (n−1)-th round of sending the read command corresponding to the level of the amount of drift of the logical block address in the second submission queue; wherein n is a positive integer.

In some examples, the first processor is configured to: when the logical block address corresponding to the read command is maintained in the write buffer, return the data corresponding to the logical block address; the first on-chip memory is further configured to: store the returned data.

In some examples, the first on-chip memory and the second on-chip memory both include a Dynamic Random Access Memory or a Static Random Access Memory.

In some examples, the memory system further includes a storage class memory; and the at least one non-volatile memory device includes a phase change memory.

In a second aspect, an example of the present disclosure provides a memory controller, the memory controller is coupled to at least one non-volatile memory device and configured to:

check whether a logical block address corresponding to a
        host read command is maintained in a write buffer;
        determine a level of an amount of drift corresponding
        to the logical block address, if the logical block address
        is not maintained in the write buffer; different levels of
        the amount of drift correspond to different read volt-
        ages; send a read command to the non-volatile memory
        device according to the level of the amount of drift
        corresponding to the logical block address; wherein at
        least two of the processes of checking whether the
        logical block address is maintained, determining the
        level of the amount of drift, and sending the read
        command are performed in parallel.

In a third aspect, an example of the present disclosure provides a method of operating a memory system, the memory system includes: at least one non-volatile memory device and a memory controller coupled to the non-volatile memory device; the method includes: checking whether a logical block address corresponding to a host read command is maintained in a write buffer; determining a level of an amount of drift corresponding to the logical block address, if the logical block address is not maintained in the write buffer; different levels of the amount of drift correspond to different read voltages; sending a read command to the non-volatile memory device according to the level of the amount of drift corresponding to the logical block address; wherein at least two of the processes of checking whether the logical block address is maintained, determining the level of the amount of drift, and sending the read command are performed in parallel.

In some examples, the processes of checking whether the logical block address is maintained, determining the level of the amount of drift, and sending the read command are all performed in parallel; the memory controller includes: a first processor, a second processor, a third processor, a first on-chip memory, and a second on-chip memory; the method includes: by the first processor, checking whether the logical block address corresponding to the host read command is maintained in the write buffer, and submitting the logical block address to the first submission queue, if the logical block address is not maintained in the write buffer; storing, by the first on-chip memory, the first submission queue; by the second processor, determining the level of the amount of drift corresponding to each of the logical block addresses in the first submission queue, and submitting the level of the amount of drift corresponding to each of the logical block addresses to a second submission queue; the second on-chip memory is configured to: store the second submission queue; sending, by the third processor, a read command to the non-volatile memory device according to the level of the amount of drift corresponding to each of the logical block addresses in the second submission queue; wherein at a same time, the logical block addresses corresponding to the first submission queue, the second submission queue and the sending the read command are different.

In some examples, before determining, by the second processor, the level of the amount of drift corresponding to each of the logical block addresses in the first submission queue and submitting the level of the amount of drift corresponding to each of the logical block addresses to the second submission queue, the method also includes: deter-mining, by the second processor, the level of the amount of drift corresponding to each of the logical block addresses according to the heat of the data corresponding to each of the logical block addresses in the first submission queue; the heat of the data represents a degree of length of average time difference between writing and reading of the data.

In some examples, the heat of the data includes: hot data, warm data, and cold data; the average time difference between writing and reading corresponding to the hot data, the warm data, and the cold data respectively becomes longer in sequence; the determining, by the second proces-sor, the level of the amount of drift corresponding to each of the logical block addresses according to the heat of the data corresponding to each of the logical block addresses in the first submission queue includes: when the data correspond-ing to the logical block address is the hot data, determining, by the second processor, that the level of the amount of drift corresponding to the logical block address is a first level of the amount of drift; when the data corresponding to the logical block address is the warm data, determining, by the second processor, that the level of the amount of drift corresponding to the logical block address is a second level of the amount of drift; when the data corresponding to the logical block address is the cold data, determining, by the second processor, that the level of the amount of drift corresponding to the logical block address is a third level of the amount of drift; wherein the first level of the amount of drift is less than the second level of the amount of drift, and the second level of the amount of drift is less than the third level of the amount of drift.

In some examples, the method further includes: determin-ing, by the second processor, the ranking of the logical block addresses in the second submission queue according to the heat of the data corresponding to each of the logical block addresses in the first submission queue; wherein the higher is the heat of the data corresponding to the logical block address, the higher is the priority of the ranking of the logical block address in the second submission queue.

5
6

In some examples, before the determining, by the second processor, a level of the amount of drift corresponding to each of the logical block addresses according to the heat of the data corresponding to each of the logical block addresses in the first submission queue, the method further includes: determining, by the second processor, the heat of the data corresponding to each of the logical block addresses in the first submission queue through querying a mapping table.

In some examples, sending, by the third processor, a read command to the non-volatile memory device according to the level of the amount of drift corresponding to each of the logical block addresses in the second submission queue includes: determining, by the third processor, a read voltage for performing an operation of a read command on the non-volatile memory device according to the level of the amount of drift corresponding to each of the logical block addresses in the second submission queue; sending, by the third processor, the read command to the non-volatile memory device according to the read voltage for performing the operation of the read command on the non-volatile memory device.

In some examples, after sending, by the third processor, the read command to the non-volatile memory device according to the level of the amount of drift corresponding to each of the logical block addresses in the second submission queue, the method further includes: by the third processor, when the reading of the non-volatile memory device successes, submitting the logical block address of the read command to the complete queue of read; and when the reading of the non-volatile memory device fails, submitting the logical block address of the read command to the complete queue of write; storing, by the second on-chip memory, the complete queue of read and the complete queue of write; redetermining, by the second processor, the level of the amount of drift corresponding to each of the logical block addresses in the complete queue of write.

In a fourth aspect, an example of the present disclosure provides a readable storage medium, the readable storage medium stores computer program that when executed, may implement the method of operating the memory system of any one of the technical schemes described above.

Examples of the present disclosure provide a memory system and a method of operating thereof, a memory controller and a readable storage medium. In an example of the present disclosure, the memory system includes: at least one non-volatile memory device and a memory controller coupled to the non-volatile memory device and configured to: send a read command to the non-volatile memory device according to the level of the amount of drift corresponding to the logical block address. In this way, the read voltage for performing the read command operation on the non-volatile memory device may be determined according to the level of the amount of drift corresponding to the logical block address, thereby facilitating the correctness of the read command operation and improving the reliability of the memory system.

Furthermore, in an example of the present disclosure, by performing, in parallel, at least two of the processes of checking whether a logical block address is maintained in the write buffer, determining the level of the amount of drift corresponding to a logical block address that is not maintained in the write buffer, or sending a read command according to the level of the amount of drift corresponding to the logical block address, read latency may be reduced and thus reading efficiency may be improved.

BRIEF DESCRIPTION OF THE DRAWINGS

FIG. 2 is a schematic flowchart of a method of operating a memory system provided by an example of the present disclosure.

FIG. 3 is a flowchart block diagram of a method of operating a memory system provided by an example of the present disclosure.

FIG. 4 is a schematic diagram of logical block addresses corresponding to a first processor, a second processor, and a third processor in the n-th time interval of the method of operating a memory system provided by an example of the present disclosure.

DETAILED DESCRIPTION

Figure 1:
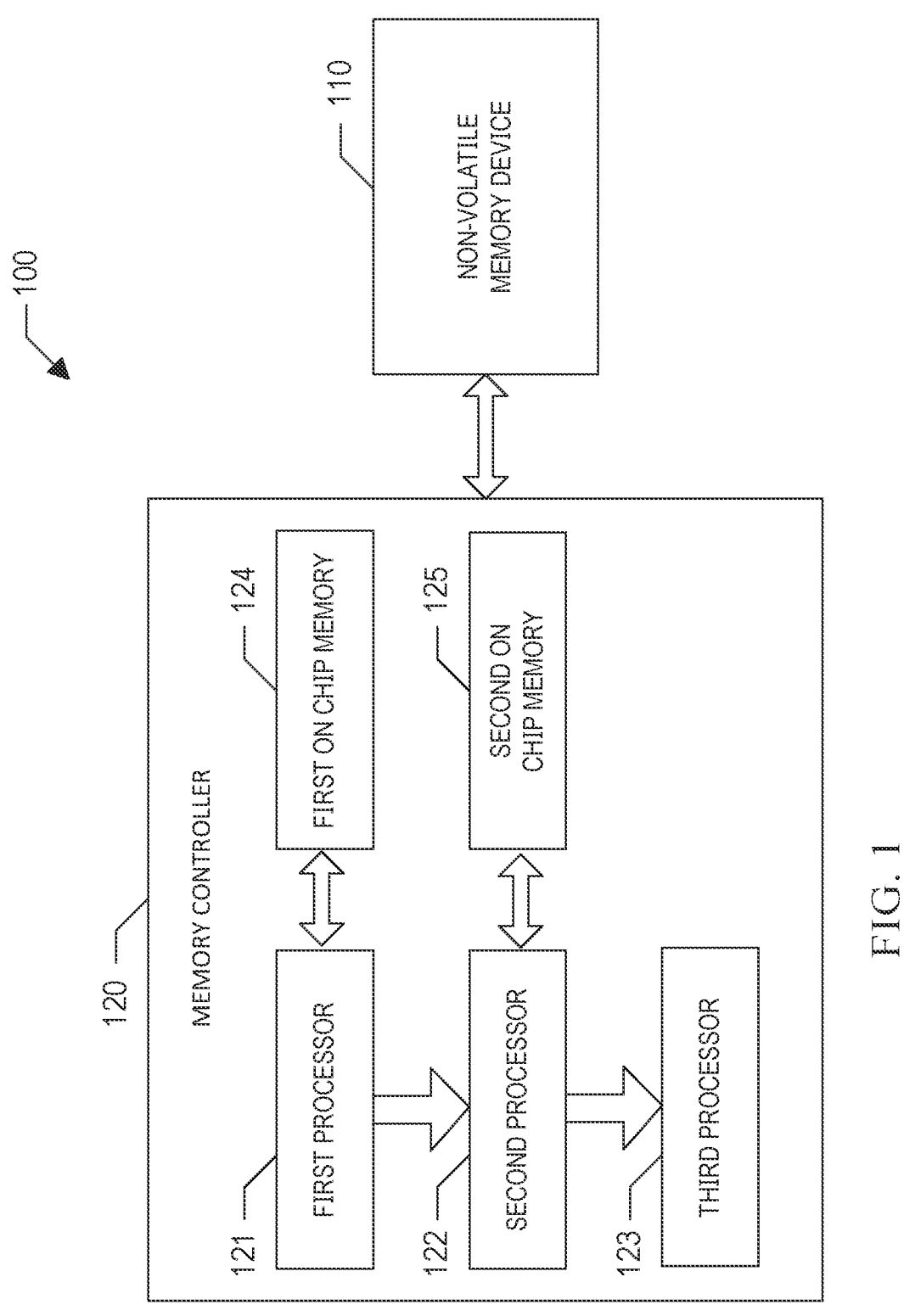
FIG. 1 is a block diagram of a memory system provided by an example of the present disclosure.

The technical schemes in implementations of the present disclosure will be described below in combination with the implementations and accompanying drawings, and the described implementations are only some, not all of implementations of the present disclosure. All other implementations obtained by those skilled in the art based on the implementations in the present disclosure without any creative efforts belong to the claimed scope of the present disclosure.

In the following description, numerous details are given in order to provide a more thorough understanding of the present disclosure. However, the present disclosure may be practiced without one or more of these details. In other examples, in order to avoid confusion with the present disclosure, some technical features known in the art are not described. For example, not all features of the actual example are described here, and well-known functions and structures are not described in detail.

In the accompanying drawings, size of a layer, a region, an element and their relative sizes may be exaggerated for clarity. Like reference numerals refer to like elements throughout the disclosure.

An element or layer referred to as being "on," "adjacent to," "connected to" or "coupled to" another element or layer may be directly on, adjacent to, connected to or coupled to another element or layer, or intervening elements or layers may be present. In contrast, when an element is referred to as being "directly on," "directly adjacent to," "directly connected to" or "directly coupled to" another element or layer, no intervening elements or layers may be present. Although the terms "first", "second", "third" etc., may be used to describe various elements, components, regions, layers and/or parts, these elements, components, regions, layers and/or parts should not be limited by these terms. These terms are only used to distinguish one element, component, region, layer or part from another element, component, region, layer or part. Thus, a first element, component, region, layer or part discussed below may be represented as a second element, component, region, layer or part without departing from teachings of the present disclosure. Whereas when a second element, component, region, layer or part is discussed, it does not indicate that a first element, component, region, layer or part must be presented in the present disclosure.

The terms of spatial relationship such as "beneath", "below", "lower", "under", "above", "on", etc., may be used herein for ease of description to describe the relationship of one element or feature with another element(s) or feature(s) as illustrated in the figures. The terms of spatial relationship are intended to encompass different orientations of the device in use or operations in addition to the orientation depicted in the figures. For example, if the device in the figures is turned over, an element or a feature described as "below" or "beneath" or "under" another element or feature would then be oriented "above" the another element or feature. Thus, in examples, the terms "below" and "under" may encompass both directions of up and down. A device may be otherwise oriented (rotated 90 degrees or at other orientations) and the terms of spatial relationship used herein should be interpreted accordingly.

A term used herein is for the purpose of describing an example only and is not to be considered as limitation of the present disclosure. As used herein, the singular forms "a", "an" and "said/the" are intended to include the plural forms as well, unless the context clearly dictates otherwise. The terms "consists of" and/or "including", when used in this description, is to identify the presence of stated features, integers, operations, steps, elements and/or parts, but do not exclude the presence or addition of one or more other features, integers, operations, steps, elements, parts and/or groups. As used herein, the term "and/or" includes any and all combinations of the associated listed items.

In order to thoroughly understand the present disclosure, detailed operations and detailed structures will be provided in the following description, so as to explain the technical scheme of the present disclosure. Examples of the present disclosure are described in detail as follows, however, the present disclosure may have other examples other than these detailed descriptions.

As described before, threshold voltage drift may lead to read margin loss and Uncorrectable Error Correction Code (UECC).

In view of this, examples of the present disclosure provide a memory system and a method of operating thereof, a memory controller and a readable storage medium.

Referring to FIGS. 1 and 2, FIG. 1 is a block diagram of a memory system provided by an example of the present disclosure, FIG. 2 is a schematic flowchart of a method of operating a memory system provided by an example of the present disclosure. As shown in FIGS. 1 and 2, an example of the present disclosure provides a method of operating a memory system, including: at least one non-volatile memory device 110 and a memory controller 120 coupled to the non-volatile memory device 110. The method described above includes the following operations.

At operation S201: check whether a logical block address corresponding to a host read command is maintained in the write buffer.

At operation S202: determining a level of an amount of drift corresponding to the logical block address, if the logical block address is not maintained in the write buffer. Different levels of the amount of drift correspond to different read voltages.

At operation S203: send a read command to the non-volatile memory device according to the level of the amount of drift corresponding to the logical block address. At least two of the processes of checking whether the logical block address is maintained, determining the level of the amount of drift, and sending the read command are performed in parallel.

In an example of the present disclosure, in operation S201, the host sends a read command to the memory controller 120. After receiving the read command sent by the host, the memory controller 120 checks whether the logical block address corresponding to the read command is maintained in the write buffer, e.g., checks whether the logical block address (LBA) corresponding to the read command is available in the write buffer.

In some examples, if the logical block address corresponding to the read command is maintained in the write buffer, the data corresponding to the logical block address may be obtained from the write buffer. In some examples, the write buffer may be located in the host. If the logical block address corresponding to the read command is maintained in the write buffer, the data corresponding to the logical block address may be obtained from the write buffer, and the access distance for obtaining the data corresponding to the logical block address is relatively short.

In some examples, if the logical block address corresponding to the read command is not maintained in the write buffer, the data corresponding to the logical block address may be obtained from the non-volatile memory device 110. If the logical block address corresponding to the read command is not maintained in the write buffer, the data corresponding to the logical block address may be obtained from the non-volatile memory device 110 through the memory controller 120, and the access distance for obtaining the data corresponding to the logical block address is relatively long.

In an example of the present disclosure, in operation S202, for the logical block address that is not maintained in the write buffer, considering that the amounts of the drift of the threshold voltages of different memory cells are different, a level of an amount of drift corresponding to the logical block address not maintained in the write buffer is determined. The read voltages corresponding to different levels of the amount of drift are different. In subsequent operations, the read voltage for performing an operation of a read command on the non-volatile memory device 110 may be determined according to the level of the amount of drift.

In an example of the present disclosure, in operation S203, a read command is sent to the non-volatile memory device 110 according to the level of the amount of drift corresponding to the logical block address. In this way, the read voltage for performing an operation of a read command on the non-volatile memory device 110 may be determined according to the level of the amount of drift corresponding to the logical block address, thereby facilitating the correctness of the read command operation and improving the reliability of the memory system 100.

In the example of the present disclosure, operation S201, operation S202 and operation S203 may be performed in a pipeline manner. In some examples, in operation S201, check whether the logical block address corresponding to the host read command is maintained in the write buffer, and different operations are subsequently performed according to whether the logical block address corresponding to the read command is maintained in the write buffer. For the logical block address that is not maintained in the write buffer, continue to execute operation S202. For example, for a fixed logical block address, operation S201 is performed, and if the logical block address is not maintained in the write buffer, operation S202 may be performed for the logical block address. In the operation S202, a level of the amount of drift corresponding to the logical block address is determined, if the logical block address is not maintained in the write buffer, and continue to perform operation S203. For example, for a fixed logical block address, operation S202 is performed, and in the case of determining the level of the amount of drift corresponding to the logical block address, operation S203 may be performed for the logical block address. In operation S203, a read command is sent to the non-volatile memory device 110 according to the level of the amount of drift corresponding to the logical block address. For example, for a fixed logical block address, operation S203 is performed to send a read command to the non-volatile memory device 110 according to the level of the amount of drift corresponding to the logical block address.

For a fixed logical block address, operation S201, operation S202 and operation S203 are performed in a pipeline manner, e.g., operation S201, operation S202 and operation S203 are performed sequentially in a serial manner. However, for multiple logical block addresses, operation S201, operation S202 and operation S203 may be performed in parallel. This is because the time spent on performing operation S201, operation S202 and operation S203 are different. In some examples, for two logical block addresses, e.g., a first logical block address and a second logical block address, operation S201, operation S202, and operation S203 may be performed sequentially on the first logical block address, and while operation S202 is being performed on the first logical block address, operation S201 may be performed on the second logical block address. For example, operation S201 on the second logical block address may be performed without waiting for the first logical block address to complete operation S201, operation S202, and operation S203. In some examples, the logical block addresses corresponding to the operations S201, S202 and S203 are different at the same time.

In an example of the present disclosure, by performing, in parallel, at least two of the processes of checking whether a logical block address is maintained in the write buffer, determining the level of the amount of drift corresponding to a logical block address that is not maintained in the write buffer, and sending a read command, read latency may be reduced and thus reading efficiency may be improved.

At least two of the processes of checking whether the logical block address is maintained, determining the level of the amount of drift, and sending the read command are performed in parallel includes three cases. In the first case, operation S201 and operation S202 are combined, e.g., operation S201 and operation S202 are performed sequentially in a serial manner with one processor, and operation S203 is performed with another processor. In this case, the processes of operation S201 and operation S202 are performed in parallel with the process of operation S203. In this way, the reading time may be saved to a certain extent, the reading latency may be reduced, and the reading efficiency may be improved.

In the second case, operation S201 is performed with a processor, operation S202 and operation S203 are combined, e.g., operation S202 and operation S203 are performed sequentially in a serial manner with another processor. In this case, the process of operation S201 is performed in parallel with the processes of operation S202 and operation S203. In this way, the reading time may be saved to a certain extent, the reading latency may be reduced, and the reading efficiency may be improved.

In the third case, operation S201, operation S202 and operation S203 are respectively performed with three processors. In this case, the processes of operation S201, operation S202 and operation S203 are all performed in parallel. In this way, the reading time may be further saved, the reading latency may be reduced, and the reading efficiency may be improved.

Referring to FIG. 3 below, FIG. 3 is a flowchart block diagram of a method of operating a memory system provided by an example of the present disclosure. As shown in combination with FIGS. 1 and 3, the processes describing in detail of checking whether the logical block address is maintained, determining the level of the amount of drift, and sending the read command are all performed in parallel.

As shown in FIGS. 1 and 3, in some examples, the processes of checking whether the logical block address is maintained, determining the level of the amount of drift, and sending the read command are all performed in parallel. In an example, the memory controller 120 includes: a first processor 121, a second processor 122, a third processor 123, a first on-chip memory 124, and a second on-chip memory 125. The method described above includes the following operations:

checking, by the first processor 121, whether a logical block address corresponding to a host read command is maintained in the write buffer, and submitting the logical block address to a first submission queue, if the logical block address is not maintained in the write buffer;

storing, by the first on-chip memory 124, the first submission queue;

determining, by the second processor 122, a level of an amount of drift corresponding to each of the logical block addresses in the first submission queue, and submitting the level of the amount of drift corresponding to each of the logical block addresses to a second submission queue;

storing, by the second on-chip memory 125, the second submission queue;

sending, by the third processor 123, a read command to the non-volatile memory device 110 according to the level of the amount of drift corresponding to each of the logical block addresses in the second submission queue;

wherein at a same time, the logical block addresses corresponding to the first submission queue, the second submission queue and the sending the read command are different.

As shown in FIG. 3, in operation S301, the host dispatch task, e.g., the host sends a read command. Wherein the host which performs an operation S301.

In operation S302, check whether the logical block address corresponding to the host read command is maintained in the write buffer. If the result of performing operation S302 is "No". e.g., the logical block address corresponding to the host read command is not maintained in the write buffer, then operation S303 is performed. If the result of performing operation S302 is "Yes", e.g., the logical block address corresponding to the host read command is maintained in the write buffer, then operation S303 is performed.

For example, in operation S302, check whether the logical block address corresponding to the host read command overlaps with the logical block address in the write buffer (Read LBA overlap check). If the logical block address corresponding to the host read command does not overlap with the logical block address in the write buffer (Writer Buffer Miss), e.g., the logical block address corresponding to the host read command is not maintained in the write buffer, then operation S303 is performed. If the logical block address corresponding to the host read command overlaps with the logical block address in the write buffer (Writer Buffer Hit), e.g., the logical block address corresponding to the host read command is maintained in the write buffer, then operation S304 is performed.

In an example of the present disclosure, the first processor 121 (e.g., Core 1) which performs operation S302, and the first processor 121 is located in the memory controller 120.

In operation S303, the logical block address is submitted to the first submission queue, if the logical block address is not maintained in the write buffer. The first submission queue is stored in a first On Chip Memory (OCM) 124, and the first on-chip memory 124 is located in the memory controller 120. For example, the first submission queue may also be referred to as a filtered submission queue, e.g., the logical block address that is not maintained in the write buffer is filtered out to form a filtered submission queue.

In an example of the present disclosure, when the logical block address corresponding to the read command is maintained in the write buffer, the first processor 121 returns the data corresponding to the logical block address. The first on-chip memory 124 stores the returned data.

In operation S304, for the logical block address maintained in the write buffer, the data corresponding to the logical block address may be returned, and the process of reading the data corresponding to the logical block address is completed. The data corresponding to the logical block address maintained in the write buffer is stored in the first on-chip memory 124.

In operation S305, a level of an amount of drift corresponding to each of the logical block addresses in the first submission queue is determined, e.g., a level of an amount of drift (Predicate Drift Level) corresponding to each of the logical block addresses in the first submission queue is predicted (calculated), and a level of an amount of drift corresponding to each of the logical block addresses is submitted to the second submission queue.

In an example of the present disclosure, the second processor 122 (e.g., Core 2) which performs operation S305, and the second processor 122 is located in the memory controller 120.

It will be described in detail below how to determine a level of an amount of drift corresponding to each of logical block addresses in the first submission queue.

In some examples, before the second processor 122 determining a level of an amount of drift corresponding to each of the logical block addresses in the first submission queue and submitting the level of the amount of drift corresponding to each of the logical block addresses to a second submission queue, the method described above also includes:

determining, by the second processor 122, a level of the amount of drift corresponding to each of the logical block addresses according to the heat of the data corresponding to each of the logical block addresses in the first submission queue. The heat of the data represents a degree of length of average time difference between writing and reading of the data.

Here, according to the heat of the data corresponding to each of the logical block addresses in the first submission queue, e.g., according to the degree of length of the time difference between writing and reading of the data corresponding to each of the logical block addresses in the first submission queue, a level of an amount of drift corresponding to each of the logical block addresses is determined. If the time difference between writing and reading of the data corresponding to the logical block address is shorter, the heat of the data corresponding to the logical block address is hotter. Accordingly, the amount of the drift of the threshold voltage of the memory cells for storing these hotter data is smaller. Conversely, if the time difference between writing and reading of the data corresponding to the logical block address is longer, the heat of the data corresponding to the logical block address is cooler. Accordingly, the amount of the drift of the threshold voltage of the memory cells for storing these cooler data is greater.

In an example of the present disclosure, according to the heat of the data corresponding to each of the logical block addresses in the first submission queue, considering that the amounts of the drift of the threshold voltage of the memory cells for storing these data are different, different read voltages are applied when performing read command operations on the non-volatile memory device, thereby ensuring the correctness of read command operation and improving the reliability of the memory system.

In some examples, before the second processor 122 determining a level of the amount of drift corresponding to each of the logical block addresses according to the heat of the data corresponding to each of the logical block addresses in the first submission queue, the method described above also includes:

determining, by the second processor 122, the heat of the data corresponding to each of the logical block addresses in the first submission queue through querying a mapping table.

In an example of the present disclosure, the mapping table includes at least one of a Bloom Filter, a Cuckoo Filter, an XOR Filter, a Vacuum Filter or a Hash Table. Examples of the present disclosure do not limit the type of the mapping table, and any mapping table that may be configured to query the heat of the data corresponding to the logical block address may be applied to the method of operating a memory system provided by examples of the present disclosure.

In some examples, data may be divided into hot data, warm data and cold data according to the length of the time difference between writing and reading of data. The time difference between writing and reading corresponding to hot data is the shortest one, the time difference between writing and reading corresponding to warm data is the second one, and the time difference between writing and reading corresponding to cold data is the longest one. The time difference between writing and reading corresponding to the hot data, the warm data, and the cold data respectively becomes longer in sequence.

In some examples, the time difference between writing and reading corresponding to hot data ranges from 1 microsecond to 2 milliseconds, the time difference between writing and reading corresponding to warm data ranges from 1 millisecond to 2 seconds, and the time difference between writing and reading corresponding to cold data ranges from 1 second to several hours.

Ranges of time differences between writing and reading of hot data, warm data and cold data may overlap. For data of which time difference between writing and reading is in a non-overlapping region, the result for determining the heat of the data is unique. In some examples, if the time difference between writing and reading of the data is in a range of 1 microsecond to 1 millisecond, the data may be determined as hot data. If the time difference between writing and reading of the data is in a range of 2 milliseconds to 1 second, the data may be determined as warm data. If the time difference between writing and reading is over 2 seconds, the data may be determined as cold data. However, for data of which time difference between writing and reading is in an overlapping region, the result for determining the heat of the data is not unique. In some examples, if the time difference between writing and reading of the data is in a range of 1 millisecond to 2 milliseconds, the data may be determined as either hot data or warm data. If the time difference between writing and reading of the data is in a range of 1 second to 2 seconds, the data may be determined as either warm data or cold data. Therefore, the heat of the data represents a degree of length of average time difference between writing and reading of the data.

When there are overlapping regions among ranges of time differences between writing and reading of hot data, warm data and cold data, these overlapping regions are all located at the intersection of the two classes of data. However, there is actually a certain window for the read voltage, and for the data in the overlapping region, the two levels of the amount of drift corresponding to the two classes of data may be applicable, at this time, the read voltages corresponding to the two levels of the amount of drift may also be applicable.

In some examples, the second processor 122 determining a level of the amount of drift corresponding to each of the logical block addresses according to the heat of the data corresponding to each of the logical block addresses in the first submission queue includes:

the second processor 122 determining that the level of the amount of drift corresponding to the logical block address is a first level of the amount of drift when the data corresponding to the logical block address is the hot data. The second processor 122 determines that the level of the amount of drift corresponding to the logical block address is a second level of the amount of drift when the data corresponding to the logical block address is the warm data. The second processor 122 determines that the level of the amount of drift corresponding to the logical block address is a third level of the amount of drift when the data corresponding to the logical block address is the cold data. The first level of the amount of drift is less than the second level of the amount of drift, and the second level of the amount of drift is less than the third level of the amount of drift.

As described above, the amount of the drift of the threshold voltage of the memory cell for storing hot data is the smallest one, the amount of the drift of the threshold voltage of the memory cell for storing warm data is the second one, and the amounts of the drift of the threshold voltage of the memory cell for storing cold data is the largest one. In this way, according to the different heat of data stored in the memory cells, it may be determined that the amounts of drift of the threshold voltage of the memory cells are different, and subsequently, according to the different amounts of the drift of the threshold voltages of the memory cells, it may be determined that different read voltages are correspondingly applied when read command operations are performed on these memory cells.

In some examples, the method described above further includes:

the second processor 122 determining the ranking of the logical block addresses in the second submission queue according to the heat of the data corresponding to each of the logical block addresses in the first submission queue. The higher is the heat of the data corresponding to the logical block address, the higher is the priority of the ranking of the logical block address in the second submission queue.

Here, the multiple logical block addresses in the first submission queue are out of order, e.g., the ranking of the hot data, warm data and cold data corresponding to the logical block addresses in the first submission queue is irregular. For example, if it is determined that the logical block address is not maintained in the write buffer, the logical block address may be submitted to the first submission queue, then the ranking of the multiple logical block addresses in the first submission queue corresponds to the time when it is determined that the logical block addresses are not maintained in the write buffer. In some examples, the heat of the data corresponding to the multiple logical block addresses not maintained in the write buffer is randomly distributed. Without considering the ranking of hot data, warm data, and cold data corresponding to the logical block addresses in the first submission queue, a level of an amount of drift corresponding to each of the logical block addresses in the first submission queue is sequentially determined to obtain a second submission queue, a read command operation is sequentially performed on each of the logical block addresses in the second submission queue.

The time difference between writing and reading corresponding to hot data is very short (e.g., 1 microsecond to 2 milliseconds), and if at this time the hot data corresponding to the logical block address in the first submission queue is ranked later (e.g., the priority of operating the hot data corresponding to the logical block address is lower), then the operation for determining a level of an amount of drift corresponding to the hot data corresponding to the logical block address in the first submission queue is delayed, and the operation for performing a read command operation on the hot data corresponding to the logical block address is further delayed. For example, the time for operating the hot data corresponding to the logical block address may exceed the timeliness of the hot data. Therefore, the ranking of the logical block addresses in the second submission queue may be determined according to the heat of the data corresponding to each of the logical block addresses in the first submission queue. For example, the higher is the heat of the data corresponding to the logical block address in the first submission queue, the higher is the ranking of the logical block address in the second submission queue, and the higher is the priority of performing the read command operation on the logical block address. In this way, the process of performing read command operations on hot data may be accelerated, and the timeliness requirement of hot data may be met.

In operation S306, a level of an amount of drift corresponding to each of the logical block addresses is submitted to a second submission queue. The second submission queue is stored in the second on-chip memory 125, and the second on-chip memory 125 is located in the memory controller 120. For example, the second submission queue may also be referred to as a predicted submission queue, e.g., a level of an amount of drift corresponding to each of the logical block addresses is predicted to form a predicted submission queue.

In operation S307, a read command is sent to the non-volatile memory device 110 according to the level of the amount of drift corresponding to each of the logical block addresses in the second submission queue. If the reading succeeds, then operation S308 is performed. If the reading fails, then operation S309 is performed.

In some examples, the third processor 123 sending a read command to the non-volatile memory device 110 according to the level of the amount of drift corresponding to each of the logical block addresses in the second submission queue includes:

the third processor 123 determining a read voltage for performing an operation of a read command on the non-volatile memory device 110 according to the level of the amount of drift corresponding to each of the logical block addresses in the second submission queue, and the third processor 123 sending a read command to the non-volatile memory device 110 according to the read voltage for performing the operation of the read command on the non-volatile memory device 110.

In an example of the present disclosure, the third processor 123 performs operation S307, and the third processor 123 is located in the memory controller 120. For example, the third processor 123 may also be referred to as storage medium controller, and the storage medium controller is located in the memory controller 120. The storage medium controller is coupled to the non-volatile memory device 110 for controlling the non-volatile memory device 110.

In some examples, after the third processor 123 sends a read command to the non-volatile memory device 110 according to the level of the amount of drift corresponding to each of the logical block addresses in the second submission queue, the method described above further includes:

when the reading of non-volatile memory device 110 succeeds, submitting, by the third processor 123, the logical block address of the read command to the complete queue of read, and when the reading of non-volatile memory device 110 fails, submitting, by the third processor 123, the logical block address of the read command to the complete queue of write;

storing, by the second on-chip memory 125, the complete queue of read and the complete queue of write; and redetermining, by the second processor 122, a level of an amount of drift corresponding to each of the logical block addresses in the complete queue of write.

In operation S308, when the reading of non-volatile memory device 110 succeeds, the logical block address corresponding to the read command is submitted to the complete queue of read. The complete queue of read is stored in the second on-chip memory 125, and the second on-chip memory 125 is located in the memory controller 120.

In operation S309, when the reading of non-volatile memory device 110 fails, the logical block address corresponding to the read command is submitted to the complete queue of write, and the method returns to perform operation S305 on each of the logical block addresses in the complete queue of write, and re-determine a level of an amount of drift corresponding to each of the logical block addresses in the complete queue of write. The complete queue of write is stored in the second on-chip memory 125, and the second on-chip memory 125 is located in the memory controller 120.

In some examples, the second processor 122 may determine, by querying the Bloom filter, whether the data corresponding to each of the logical block addresses in the first submission queue is warm data or cold data. However, the accuracy rate of querying Bloom filters is not 100%, e.g., there may be misjudgment rate (e.g., false positive). For example, the second processor 122 determines that the data corresponding to a logical block address in the first submission queue is warm data (or cold data) through querying the Bloom filter, but in fact, the data corresponding to the logical block address is cold data (or warm data). Further, a level of an amount of drift corresponding to the logical block address is determined, according to the heat of the data corresponding to the logical block address, and then the read voltage is determined according to the level of the amount of drift corresponding to the logical block address. Because the result of determining the heat of the data corresponding to the logical block address in the first submission queue is wrong according to the heat of the data corresponding to the logical block address, the result of determining level of the amount of drift corresponding to the logical block address is wrong, and then the result of determining the read voltage according to the level of the amount of drift corresponding to the logical block address is also wrong. Using a wrong read voltage for the read command operation may cause a read failure. Therefore, a level of an amount of drifts corresponding to the logical block addresses corresponding to these failed read command operations is re-determined.

In an example of the present disclosure, the algorithm design of the memory controller 120 may be optimized without increasing the cost, e.g., without adding hardware, and the read voltage for performing the read command operation on the non-volatile memory device 110 may be determined according to the level of the amount of drift corresponding to the logical block address, thereby facilitating the correctness of the read command operation, and in turn improving the reliability of the memory system. Furthermore, by performing, in parallel, the processes of checking whether a logical block address is maintained in the write buffer, determining the level of the amount of drift corresponding to a logical block address that is not maintained in the write buffer, and sending a read command, read latency may be reduced and thus reading efficiency may be improved.

Referring to FIG. 4, FIG. 4 is a schematic diagram of logical block addresses corresponding to a first processor, a second processor, and a third processor in the n-th time interval of the method of operating a memory system provided by an example of the present disclosure. FIG. 4 shows operation S201, operation S202 and operation S203, and different operations are separated by dotted lines. A first processor is configured to perform operation S201, a second processor is configured to perform operation S202, and a third processor is configured to perform operation S203.

In some examples, the first processor is configured to perform operation S201, to check whether a logical block address corresponding to a host read command is maintained in the write buffer, and submit the logical block address to the first submission queue if the logical block address is not maintained in the write buffer. For example, each of the logical block addresses in the first submission queue is not maintained in the write buffer, and the first processor filters out logical block addresses not maintained in the write buffer among the logical block addresses corresponding to the host read command. In some examples, the first processor may check a total of 20 logical block addresses in each time interval, and submit the logical block addresses not maintained in the write buffer among the 20 logical block addresses to the first submission queue.

The multiple logical block addresses in the first submission queue are out of order, e.g., the ranking of the hot data, warm data and cold data corresponding to the logical block addresses in the first submission queue is irregular.

In some examples, the second processor is configured to perform operation S202, to determine a level of an amount of drift corresponding to each of the logical block addresses in the first submission queue, and submit the level of the amount of drift corresponding to each of the logical block addresses to a second submission queue. In some examples, the second processor may determine (or calculate) levels of the amount of drift corresponding to a total of 5 logical block addresses within each time interval. For example, within a time interval of the same duration, the number of logical block addresses processed by the first processor and the second processor may be different.

In some examples, the third processor is configured to perform operation S203, to send a read command to the non-volatile memory device 110 according to the level of the amount of drift corresponding to each of the logical block addresses in the second submission queue.

In an example of the present disclosure, for a fixed logical block address, operation S201, operation S202 and operation S203 are performed in a pipeline manner. However, for multiple logical block addresses, within the n-th time interval, the first processor performs the (n+1)-th round of checking whether the logical block address is maintained in the write buffer, the second processor performs the n-th round of determining the level of the amount of drift corresponding to the logical block address in the first submission queue, and the third processor performs the (n−1)-th round of sending a read command corresponding to a level of an amount of drift of the logical block address in the second submission queue, wherein n is a positive integer. For example, operation S201, operation S202, and operation S203 are performed in parallel, and at the same time, the logical block addresses processed by operation S201, operation S202, and operation S203 are different.

For each of operation S201, operation S202 and operation S203, there are the (n−1)-th round, the n-th round and the (n+1)-th round in which time intervals thereof are continuous, and the processing time of each of rounds corresponds to a time interval. Here, the duration of a time interval may be selected depend on the actual condition, and the setting of the time period corresponding to the heat and the parameters of each of processors in the memory controller may be considered. In some examples, the duration of the time interval may be K*160 ns, wherein K may be obtained according to empirical values.

The number of rounds processed by two adjacent operations in the same time interval differs at least by one round, in some examples, as shown in FIG. 4, in the n-th time interval, such that operation S201 is processing the (n+1)-th round, operation S202 is processing the n-th round, and operation S203 is processing the (n−1)-th round. The number of rounds processed by two adjacent operations in the same time interval may differ by more than one round, in some examples, in the n-th time interval, such that operation S201 is processing the (n+3)-th round, operation S202 is processing the n-th round, and operation S203 is processing the (n−3)-th round. The process result obtained by the operation S201 processing the (n+1)-th round and the (n+2)-th round may be stored in the first on-chip memory. In the case that the number of rounds processed by two adjacent operations in the same time interval differs by one round, the intermediate results stored in the first on-chip memory and the second on-chip memory are less, and after the processes of n-th round is completed in operation S201, the process result is provided to operation S202, so that the connection between various operations is more compact, which is beneficial to save time and improve efficiency. For a fixed logical block address, operation S201, operation S202 and operation S203 are performed serially, but for multiple logical block addresses, operation S201, operation S202 and operation S203 are performed in parallel.

In an example of the present disclosure, the memory system 100 may include a Storage Class Memory (SCM). The non-volatile memory device 110 may include a Phase Change Memory (PCM).

At the existing storage hierarchical structure, there is a gap in storage speed and storage capacity between Dynamic Random Access Memory (DRAM) and non-volatile memory devices (e.g., NAND flash memory), which limits the further improvement of computing power of a computer. In this respect, a storage class memory of which storage speed and storage capacity are between those of a dynamic random access memory and a non-volatile memory is proposed. In some examples, storage density of DRAM, PCM, and NAND may be 1×, 1× to 4×, and 4× in sequence; read latency of DRAM, PCM, and NAND may be 50 nanoseconds, 50 to 100 nanoseconds, and 10 to 25 microseconds in sequence; write latency of DRAM, PCM, and NAND may be 20 to 50 nanoseconds, 1 microsecond, and 100 microseconds, in sequence. The storage speed (read latency and write latency) and storage capacity (storage density) of PCM enable it to better reside between the dynamic random access memory and the non-volatile memory, acting as an intermediate memory.

At present, there are many types of storage media for storage class memory, including Phase Change Memory, Resistive Random Access Memory (RRAM), Magnetoresistive Random Access Memory (MRAM) and Nantero's CNT Random Access Memory (NRAM).

The basic principle of phase change memory is: apply an electric pulse with a large signal value and a short duration (e.g., high and narrow) to the phase change memory cell, and under the action of Joule heat, etc., a part of the initial crystalline phase change memory layer melts because the temperature is higher than the melting temperature. After the electric pulse is interrupted, the molten portion cools rapidly and stays in an amorphous state with a low degree of atomic order, thereby the conversion from low resistance to high resistance is completed, which is the reset process. The molten portion of this process is referred to as the programming volume. If an electric pulse with a small signal value and a long duration (e.g., low and wide) is applied, the temperature in the programming volume reaches above the crystallization temperature and below the melting temperature for a sufficient time to cause crystallization of the amorphous structure within the programmed volume, a low-resistance state is obtained, which is the set process. The read process of the phase change memory is to apply a low and narrow electric pulse to the phase change memory cell, so that the phase change memory layer is below the crystallization temperature, and measure the resistance value of the phase change memory cell.

As phase change storage materials become the storage medium of phase change memory, the performance of phase change memory material directly affects the characteristics of the device. In some examples, the characteristics of phase change memory is mainly measured by indicators such as set operation speed, data retention and switching ratio. Therefore, research on the performance of phase change memory materials includes research on parameters such as crystallization rate, crystallization temperature, stability of amorphous structure, thermal stability, and resistance window (e.g., the ratio of resistivity of the amorphous and crystalline states).

For a phase change memory, among a set operation, a reset operation and a read operation, in some examples, the time of a set operation is longer, which becomes a factor restricting the high-speed operation of phase change memory. The set operation time is related to the crystallization rate of the phase change memory material. The faster the crystallization rate, the shorter the set operation time, and the faster the operation speed of the phase change memory.

The capability for maintaining data of a phase change memory depends on the stability and thermal stability of the amorphous structure of the phase change memory material. The better the amorphous structure stability and thermal stability, the longer the capability for maintaining data. To obtain better amorphous structure stability and thermal stability, the phase change memory material may have a higher crystallization temperature.

The switching ratio of the phase change memory is determined by the resistance window of the phase change memory material. The resistance window refers to the difference in resistivity between the amorphous and crystalline states. The resistivity difference between the amorphous state and the crystalline state is large, and the resistance window is large to ensure a large switching ratio, so that the data may be read accurately and quickly in the read operation.

In an example of the present disclosure, the first on-chip memory 124 and the second on-chip memory 125 both include a Dynamic Random Access Memory or a Static Random Access Memory.

In an example of the present disclosure, the first on-chip memory 124 is configured to store the intermediate result of operation S201, including the first submission queue and the data corresponding to the logical block address maintained in the write buffer. The second on-chip memory 125 is configured to store the intermediate result of operation S202, including a second submission queue, a complete queue of write and a complete queue of read. Through performing operation S201, operation S202 and operation S203 in parallel, the efficiency of reading the non-volatile memory device 110 may be accelerated, and in turn, the storage capacity of the first on-chip memory 124 and the second on-chip memory 125 for storing these intermediate results may be minimized.

Figure 5:
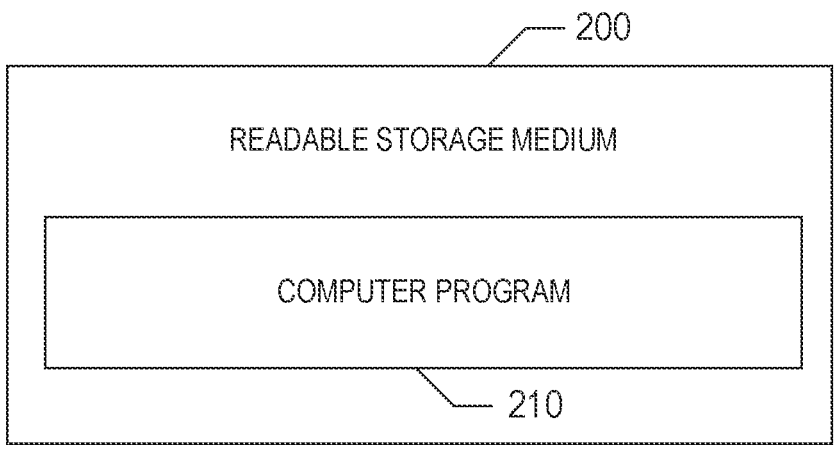
FIG. 5 is a block diagram of a readable storage medium provided by an example of the present disclosure.

Referring to FIG. 5, FIG. 5 is a block diagram of a readable storage medium provided by an example of the present disclosure. As shown in FIG. 5, an example of the present disclosure provides a readable storage medium, the readable storage medium 200 stores computer program 210, the computer program 210 when executed, may implement the method of operating for memory system of the technical schemes described above. The method of operating includes: checking whether the logical block address corresponding to the host read command is maintained in the write buffer; determining the level of the amount of drift corresponding to the logical block address that is not maintained in the write buffer, where different levels of the amount of drift correspond to different read voltages; and sending a read command to the non-volatile memory device 110 according to the level of the amount of drift corresponding to the logical block address, wherein at least two of the processes of checking whether the logical block address is maintained, determining the level of the amount of drift, and sending the read command are performed in parallel.

An example of the present disclosure provides a method of operating for a memory controller. The memory controller is coupled to at least one non-volatile memory device 110. The method includes:

checking whether the logical block address corresponding to the host read command is maintained in a write buffer;

determining the level of the amount of drift corresponding to the logical block address, if the logical block address is not maintained in the write buffer; different levels of the amount of drift correspond to different read voltages; and sending a read command to the non-volatile memory device 110 according to the level of the amount of drift corresponding to the logical block address, wherein at least two of the processes of checking whether the logical block address is maintained, determining the level of the amount of drift, and sending the read command are performed in parallel.

Figure 6:
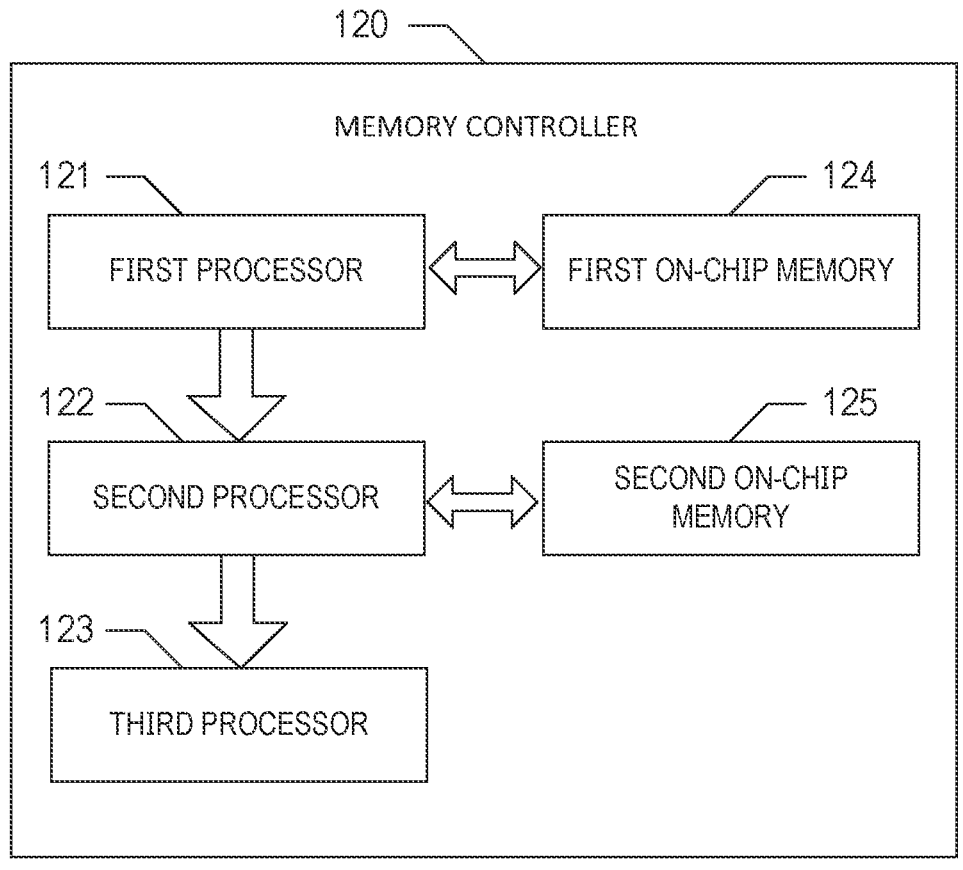
FIG. 6 is a block diagram of a memory controller provided by an example of the present disclosure.

Referring to FIG. 6, FIG. 6 is a block diagram of a memory controller provided by an example of the present disclosure. As shown in FIG. 6, an example of the present disclosure provides a memory controller, the memory controller 120 is coupled to at least one non-volatile memory device (not shown in FIG. 6) and configured to:

check whether a logical block address corresponding to a host read command is maintained in a write buffer;

determine a level of an amount of drift corresponding to the logical block address, if the logical block address is not maintained in the write buffer, where different levels of the amount of drift correspond to different read voltages; and send a read command to the non-volatile memory device according to the level of the amount of drift corresponding to the logical block address, wherein at least two of the processes of checking whether the logical block address is maintained, determining the level of the amount of drift, and sending the read command are performed in parallel.

FIG. 6 illustrates that the memory controller 120 includes a first processor 121, a second processor 122, a third processor 123, a first on-chip memory 124 and a second on-chip memory 125. The first processor 121 checks whether a logical block address corresponding to a host read command is maintained in the write buffer, and submits the logical block address to the first submission queue, if the logical block address is not maintained in the write buffer. The first on-chip memory 124 stores the first submission queue. The second processor 122 determines a level of an amount of drift corresponding to each of the logical block addresses in the first submission queue, and submits a level of an amount of drift corresponding to each of the logical block addresses to a second submission queue. The second on-chip memory 125 stores the second submission queue. The third processor 123 sends a read command to the non-volatile memory device according to the level of the amount of drift corresponding to each of the logical block addresses in the second submission queue. At a same time, the logical block addresses corresponding to the first submission queue, the second submission queue and the sending the read command are different.

In an example of the present disclosure, the memory controller may be coupled to the host and the non-volatile memory device respectively, and configured to control the non-volatile memory device. The memory controller may include a communication interface, and the memory controller may communicate with the host through a portion of the communication interface; the memory controller may communicate with the non-volatile memory device through another portion of the communication interface, and is configured to manage data stored in the non-volatile memory device.

Referring to FIG. 1, an example of the present disclosure provides a memory system, the memory system 100 includes: at least one non-volatile memory device 110 and a memory controller 120 coupled to the non-volatile memory device 110. The memory controller 120 described above is configured to:

check whether a logical block address corresponding to a host read command is maintained in a write buffer;

determine a level of an amount of drift corresponding to the logical block address, if the logical block address is not maintained in the write buffer, where different levels of the amount of drift correspond to different read voltages; and send a read command to the non-volatile memory device 110 according to the level of the amount of drift corresponding to the logical block address, wherein at least two of the processes of checking whether the logical block address is maintained, determining the level of the amount of drift, and sending the read command are performed in parallel.

In some examples, the processes of checking whether the logical block address is maintained, determining the level of the amount of drift, and sending the read command are all performed in parallel. The memory controller 120 includes: a first processor 121, a second processor 122, a third processor 123, a first on-chip memory 124, and a second on-chip memory 125. The first processor 121 is configured to: check whether a logical block address corresponding to a host read command is maintained in the write buffer, and submit the logical block address to the first submission queue, if the logical block address is not maintained in the write buffer. The first on-chip memory 124 is configured to: store the first submission queue.

The second processor 122 is configured to: determine a level of an amount of drift corresponding to each of the logical block addresses in the first submission queue, and submit the level of the amount of drift corresponding to each of the logical block addresses to a second submission queue. The second on-chip memory 125 is configured to: store the second submission queue.

The third processor 123 is configured to: send a read command to the non-volatile memory device 110 according to the level of the amount of drift corresponding to each of the logical block addresses in the second submission queue. At a same time, the logical block addresses corresponding to the first submission queue, the second submission queue and the sending the read command are different.

In some examples, the second processor 122 is configured to: determine a level of the amount of drift corresponding to each of the logical block addresses according to the heat of the data corresponding to each of the logical block addresses in the first submission queue. The heat of the data represents a degree of length of average time difference between writing and reading of the data.

In some examples, the heat of the data includes: hot data, warm data, and cold data; the average time difference between writing and reading corresponding to the hot data, the warm data, and the cold data respectively becomes longer in sequence.

In some examples, the second processor 122 is configured to: when the data corresponding to the logical block address is the hot data, determine that the level of the amount of drift corresponding to the logical block address is a first level of the amount of drift. When the data corresponding to the logical block address is the warm data, determine that the level of the amount of drift corresponding to the logical block address is a second level of the amount of drift. When the data corresponding to the logical block address is the cold data, determine that the level of the amount of drift corresponding to the logical block address is a third level of the amount of drift. The first level of the amount of drift is less than the second level of the amount of drift, and the second level of the amount of drift is less than the third level of the amount of drift.

In some examples, the second processor 122 is configured to: determine the ranking of the logical block addresses in the second submission queue according to the heat of the data corresponding to each of the logical block addresses in the first submission queue. The higher the heat of the data corresponding to the logical block address, the higher the priority of the ranking of the logical block address in the second submission queue.

In some examples, the second processor 122 is configured to: determine the heat of the data corresponding to each of the logical block addresses in the first submission queue through querying a mapping table.

In some examples, the third processor 123 is configured to: determine a read voltage for performing an operation of a read command on the non-volatile memory device 110 according to the level of the amount of drift corresponding to each of the logical block addresses in the second submission queue; and send a read command to the non-volatile memory device 110 according to the read voltage for performing the operation of the read command on the non-volatile memory device 110.

In some examples, the third processor 123 is configured to: when the reading of non-volatile memory device 110 succeeds, the logical block address of the read command is submitted to the complete queue of read; and when the reading of non-volatile memory device 110 fails, the logical block address of the read command is submitted to the complete queue of write.

The second on-chip memory 125 is further configured to: store the complete queue of read and the complete queue of write.

The second processor 122 is further configured to: redetermine the level of the amount of drift corresponding to each of the logical block addresses in the complete queue of write.

In some examples, within the n-th time interval, the first processor 121 is configured to: perform the (n+1)-th round of checking whether the logical block address is maintained in the write buffer. The second processor 122 is configured to: perform the n-th round of determining the level of the amount of drift corresponding to the logical block address in the first submission queue. The third processor 123 is configured to: perform the (n−1)-th round of sending a read command corresponding to a level of an amount of drift of the logical block address in the second submission queue, wherein n is a positive integer.

In some examples, the first processor 121 is configured to: when the logical block address corresponding to the read command is maintained in the write buffer, return the data corresponding to the logical block address;

The first on-chip memory 124 is further configured to: store the returned data.

In some examples, the first on-chip memory 124 and the second on-chip memory 125 both include a Dynamic Random Access Memory or a Static Random Access Memory.

In some examples, the memory system 100 includes a storage class memory; and the non-volatile memory device 110 includes a phase change memory.

Figure 7:
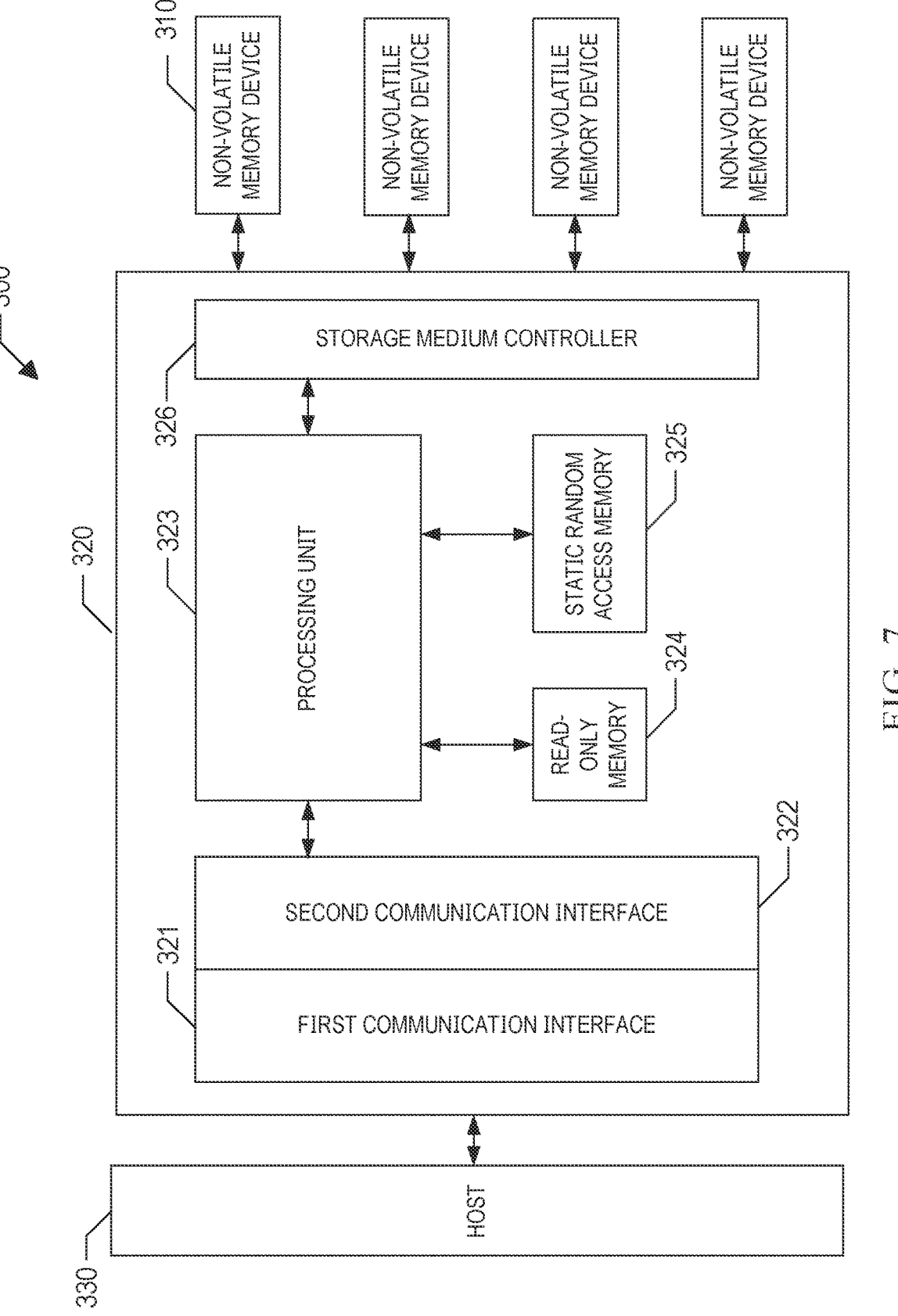
FIG. 7 is a block diagram of a system provided by an example of the present disclosure.

Referring to FIG. 7, FIG. 7 is a block diagram of a system provided by an example of the present disclosure. As shown in FIG. 7, system 300 may be a mobile phone, desktop computer, laptop computer, tablet computer, vehicle computer, or any other suitable electronic device having non-volatile memory device 310 (e.g., PCM) therein.

As shown in FIG. 7, system 300 may include a host 330 and a memory system, and the memory system may include a memory controller 320 and at least one non-volatile memory device 310. The host 330 may be a processor of an electronic device (e.g., a Central Processing Unit (CPU)) or a System on Chip (SoC) (e.g., an Application Processor (AP)). The host 330 may be configured to send data to or receive data from the non-volatile memory device 310. FIG. 7 shows that the memory controller 320 is connected to four non-volatile memory devices 310, however in fact, examples of the present disclosure do not limit the number of non-volatile memory devices 310 connected to the memory controller 320, and the number of non-volatile memory devices 310 connected to the memory controller 320 may be less than 4 (e.g., 1); or the number of non-volatile memory devices 310 connected to the memory controller 320 may be greater than 4 (e.g., 5).

In some examples, the memory controller 320 may be coupled to the host 330 and the non-volatile memory device 310 respectively, and configured to control the non-volatile memory device 310. The memory controller 320 may manage data stored in the non-volatile memory device 310 and communicate with the host 330.

In an example, the memory system may include at least one non-volatile memory device 310 and a memory controller 320 coupled to the non-volatile memory device 310, wherein the memory system may include a storage class memory. The non-volatile memory device 310 may include a phase change memory.

Still referring to FIG. 7, the memory controller 320 includes a first communication interface 321, a second communication interface 322, a Processing Unit 323, a Read Only Memory (ROM) 324, a Static Random Access Memory 325 and a storage medium controller 326. The processing unit 323 and the host 330 are communicatively connected through a first communication interface 321 and a second communication interface 322. The processing unit 323 may also be connected to a storage medium controller 326 for controlling the storage medium controller 326, and the storage medium controller 326 is connected to the non-volatile memory device 310 for controlling the non-volatile memory device 310. The processing unit 323 may also be connected to the Read-Only Memory 324 and the Static Random Access Memory 325, the processing unit 323 may obtain data from the Read-Only Memory 324, and the processing unit 323 may store part of the temporary data in the Static Random Access Memory 325.

In some examples, the first communication interface 321 may be Peripheral Component Interconnect Express (PCIE), e.g., the first communication interface may be an interface set according to the high-speed serial computer expansion bus standard; the second communication interface 322 may be a Compute Express Link (CXL).

In an example, the non-volatile memory device 310 may include a phase change memory. The read latency at the system level will affect the actual throughput of a storage class memory. The threshold voltage of the phase change material of the phase change memory in the storage class memory will change over time. The Raw Bit Error Rate (RBER) may be guaranteed only through predicting the amount of drift corresponding to the logical block address of the data according to the heat of the data, and adjusting the read voltage according to the amount of drift corresponding to the logical block address.

When the read latency of the storage medium is very small (~160 nanoseconds), the amount of drift corresponding to each of the read logical block addresses is predicted, and the read voltage is adjusted according to the amount of drift corresponding to the logical block address. In an aspect, the drift time range of the threshold voltage is large, and it is difficult to track all the written logical block addresses. Different drift speeds may lead to read margin loss and Uncorrectable Error Correction Code (UECC). In another aspect, the time difference between writing and reading of the hot data is short, and through giving priority to reading the logical block address corresponding to the hot data, to avoid exceeding the timeliness of the hot data. Therefore, predicting the amount of drift of the storage medium (e.g., the phase change material) in the storage class memory facilitates increasing the reliability and correctness of the data maintained in the storage medium.

In an example, a manner of a pipeline is employed to querying the Bloom filter and reading of data from the storage medium are performed in parallel, so that reading latency may be avoided. In this scheme, efficiency for the flow of reading among the core processor (e.g., the first processor and the second processor), the storage medium controller (e.g., the third processor) and the storage medium (e.g., the non-volatile memory device) are focused on. In this way, the promised Raw Bit Error Rate may be guaranteed without affecting the overall read latency.

In an example, the read operation includes the following three operations:

Operation 1: check whether the logical block address to be read overlaps with the logical block address in the write buffer by using the core processor (e.g., Core1), and pack the logical block addresses that are not maintained in the write buffer to obtain the first submission queue, where the core processor here may correspond to the first processor described above;

Operation 2: predict a drift of a logical block address that is not maintained in the write buffer by using the core processor (e.g., Core2), wherein the amount of drift corresponding to the logical block address may be predicted according to the heat of the data corresponding to the logical block address, where the core processor here may correspond to the second processor described above; and Operation 3: send a read command to the non-volatile memory device by using the storage medium controller, the amount of drift of the logical block address corresponding to the read command has been predicted in operation 2, where the storage medium controller here may correspond to the third processor described above.

The three operations described above may be performed in a manner of a pipeline to improve reading efficiency, and the three operations run in parallel at the same time. The intermediate results obtained by each operation may be stored in the on-chip memory.

Examples of the present disclosure provide a memory system and a method of operating thereof, a memory controller and a readable storage medium. In an example of the present disclosure, a memory system includes: at least one non-volatile memory device and a memory controller coupled to the non-volatile memory device, and configured to: send a read command to the non-volatile memory device according to the level of the amount of drift corresponding to the logical block address. In this way, the read voltage for performing an operation of a read command on the non-volatile memory device may be determined according to the level of the amount of drift corresponding to the logical block address, thereby facilitating the correctness of the read command operation and improving the reliability of the memory system.

Furthermore, in an example of the present disclosure, by performing, in parallel, at least two of the processes of checking whether a logical block address is maintained in the write buffer, determining the level of the amount of drift corresponding to a logical block address that is not maintained in the write buffer, and sending a read command according to the level of the amount of drift corresponding to the logical block address, read latency may be optimized and thus reading efficiency may be improved.

Reference throughout the description to "one example" or "an example" indicates that a particular feature, structure or characteristic related to the example is included in at least one example of the present disclosure. Thus, appearances of "in one example" or "in an example" in various places throughout the description are not necessarily referring to a same example. Furthermore, these particular features, structures or characteristics may be combined in any appropriate manner in one or more examples. In various examples of the present disclosure, sequence numbers of the processes described above do not mean the execution order, and the execution order of each process should be determined by its function and internal logic, and should not constitute any limitation to implementation process of examples of the present disclosure. The serial numbers of examples of the present disclosure described above are for the purpose of description only, and do not represent the advantages and disadvantages of the examples.

The above is only an example of the present disclosure, and does not limit the patent scope of the present disclosure, and under the inventive concept of the present disclosure, any equivalent structural transformation made with the content of the present disclosure and the accompanying drawings, or direct/indirect application in other related technical fields are included in the patent protection scope of the present disclosure.

What is claimed is:

1. A memory system, including:
at least one non-volatile memory device; and
a memory controller coupled to the non-volatile memory device and configured to:
check whether a logical block address corresponding to a host read command is maintained in a write buffer;
determine a level of an amount of drift corresponding to the logical block address, if the logical block address is not maintained in the write buffer, where different levels of the amount of drift correspond to different read voltages; and
send a read command to the non-volatile memory device according to the level of the amount of drift corresponding to the logical block address,
wherein at least two of the processes of checking whether the logical block address is maintained, determining the level of the amount of drift, or sending the read command are performed in parallel on different logical block addresses.

2. The memory system of claim 1, wherein the processes of checking whether the logical block address is maintained, determining the level of the amount of drift, and sending the read command are all performed in parallel on different logical block addresses; and the memory controller includes: a first processor, a second processor, a third processor, a first on-chip memory, and a second on-chip memory, wherein:
the first processor is configured to:
check whether the logical block address corresponding to the host read command is maintained in the write buffer, and
submit the logical block address to a first submission queue, if the logical block address is not maintained in the write buffer;
the first on-chip memory is configured to store the first submission queue;

the second processor is configured to:
determine the level of the amount of drift corresponding to each of the logical block addresses in the first submission queue, and
submit the level of the amount of drift corresponding to each of the logical block addresses to a second submission queue;
the second on-chip memory is configured to store the second submission queue; and
the third processor is configured to:
send the read command to the non-volatile memory device according to the level of the amount of drift corresponding to each of the logical block addresses in the second submission queue, and
wherein at a same time, the logical block addresses corresponding to the first submission queue, the second submission queue and the sending the read command are different.

3. The memory system of claim 2, wherein the second processor is configured to:
determine the level of the amount of drift corresponding to each of the logical block addresses according to a heat of data corresponding to each of the logical block addresses in the first submission queue, where the heat of the data represents a degree of length of average time difference between writing and reading of the data.

4. The memory system of claim 3, wherein the heat of the data includes: hot data, warm data, and cold data, and the average time difference between writing and reading corresponding to the hot data, the warm data, and the cold data respectively becomes longer in sequence, wherein:
the second processor is configured to:
when the data corresponding to the logical block address is the hot data, determine that the level of the amount of drift corresponding to the logical block address is a first level of the amount of drift;
when the data corresponding to the logical block address is the warm data, determine that the level of the amount of drift corresponding to the logical block address is a second level of the amount of drift; and
when the data corresponding to the logical block address is the cold data, determine that the level of the amount of drift corresponding to the logical block address is a third level of the amount of drift, and
wherein the first level of the amount of drift is less than the second level of the amount of drift, and the second level of the amount of drift is less than the third level of the amount of drift.

5. The memory system of claim 4, wherein the second processor is configured to:
determine a ranking of the logical block addresses in the second submission queue according to the heat of the data corresponding to each of the logical block addresses in the first submission queue, and
wherein a higher the heat of the data corresponding to the logical block address, the higher a priority of the ranking of the logical block address in the second submission queue.

6. The memory system of claim 3, wherein the second processor is configured to:
determine the heat of the data corresponding to each of the logical block addresses in the first submission queue through querying a mapping table.

7. The memory system of claim 2, wherein the third processor is configured to:

determine a read voltage for performing an operation of the read command on the non-volatile memory device according to the level of the amount of drift corresponding to each of the logical block addresses in the second submission queue; and send the read command to the non-volatile memory device according to the read voltage for performing the operation of the read command on the non-volatile memory device.

8. The memory system of claim 2, wherein:

the third processor is configured to:

when the reading of the non-volatile memory device succeeds, submit the logical block address of the read command to a complete queue of read; and when the reading of the non-volatile memory device fails, submit the logical block address of the read command to a complete queue of write, the second on-chip memory is further configured to store the complete queue of read and the complete queue of write, and the second processor is further configured to redetermine the level of the amount of drift corresponding to each of the logical block addresses in the complete queue of write.

9. The memory system of claim 2, wherein within an n-th time interval:

the first processor is configured to perform an (n+1)-th round of checking whether the logical block address is maintained in the write buffer;

the second processor is configured to perform the n-th round of determining the level of the amount of drift corresponding to the logical block address in the first submission queue; and the third processor is configured to perform an (n−1)-th round of sending the read command corresponding to the level of the amount of drift of the logical block address in the second submission queue, wherein n is a positive integer.

10. The memory system of claim 2, wherein:

the first processor is configured to, when the logical block address corresponding to the read command is maintained in the write buffer, return data corresponding to the logical block address, and the first on-chip memory is further configured to store the returned data.

11. The memory system of claim 2, wherein the first on-chip memory and the second on-chip memory both include a Dynamic Random Access Memory or a Static Random Access Memory.

12. The memory system of claim 1, further including a storage class memory, wherein the at least one non-volatile memory device includes a phase change memory.

13. A memory controller, which is coupled to at least one non-volatile memory device and configured to:

check whether a logical block address corresponding to a host read command is maintained in a write buffer;

determine a level of an amount of drift corresponding to the logical block address, if the logical block address is not maintained in the write buffer, where different levels of the amount of drift correspond to different read voltages; and send a read command to the non-volatile memory device according to the level of the amount of drift corresponding to the logical block address, wherein at least two of the processes of checking whether the logical block address is maintained, determining the level of the amount of drift, or sending the read command are performed in parallel on different logical block addresses.

14. A method of operating a memory system, wherein:

the memory system includes:

at least one non-volatile memory device; and a memory controller coupled to the non-volatile memory device, the method includes:

determining that a logical block address corresponding to a host read command is not maintained in a write buffer;

determining a level of an amount of drift corresponding to the logical block address, responsive to determining that the logical block address is not maintained in the write buffer, where different levels of the amount of drift correspond to different read voltages; and sending a read command to the non-volatile memory device according to the level of the amount of drift corresponding to the logical block address, and at least two of the processes of determining that the logical block address is not maintained, determining the level of the amount of drift, or sending the read command are performed in parallel on different logical block addresses.

15. The method of claim 14, wherein the processes of determining that the logical block address is not maintained, determining the level of the amount of drift, and sending the read command are all performed in parallel on different logical block addresses, the memory controller includes: a first processor, a second processor, a third processor, a first on-chip memory, and a second on-chip memory, the method includes:

determining, by the first processor, that the logical block address corresponding to the host read command is not maintained in the write buffer;

submitting, by the first processor, the logical block address to a first submission queue if the logical block address is not maintained in the write buffer;

storing, by the first on-chip memory, the first submission queue;

determining, by the second processor, the level of the amount of drift corresponding to each of the logical block addresses in the first submission queue; and submitting, by the second processor, the level of the amount of drift corresponding to each of the logical block addresses to a second submission queue;

storing, by the second on-chip memory, the second submission queue; and sending, by the third processor, the read command to the non-volatile memory device according to the level of the amount of drift corresponding to each of the logical block addresses in the second submission queue, and wherein at a same time, the logical block addresses corresponding to the first submission queue, the second submission queue and the sending the read command are different.

16. The method of claim 15, wherein before the second processor determining the level of the amount of drift corresponding to each of the logical block addresses in the first submission queue, and submitting the level of the amount of drift corresponding to each of the logical block addresses to the second submission queue, the method further includes:

determining, by the second processor, the level of the amount of drift corresponding to each of the logical block addresses according to a heat of data corresponding to each of the logical block addresses in the first submission queue, wherein the heat of the data represents a degree of length of average time difference between writing and reading of the data.

17. The method of claim 16, wherein the heat of the data includes: hot data, warm data, and cold data, the average time difference between writing and reading corresponding to the hot data, the warm data, and the cold data respectively becomes longer in sequence, and the determining, by the second processor, the level of the amount of drift corresponding to each of the logical block addresses according to the heat of the data corresponding to each of the logical block addresses in the first submission queue includes:

when the data corresponding to the logical block address is the hot data, determining, by the second processor, that the level of the amount of drift corresponding to the logical block address is a first level of the amount of drift;

when the data corresponding to the logical block address is the warm data, determining, by the second processor, that the level of the amount of drift corresponding to the logical block address is a second level of the amount of drift; and when the data corresponding to the logical block address is the cold data, determining, by the second processor, that the level of the amount of drift corresponding to the logical block address is a third level of the amount of drift, and wherein the first level of the amount of drift is less than the second level of the amount of drift, and the second level of the amount of drift is less than the third level of the amount of drift.

18. The method of claim 17, further including:

determining, by the second processor, a ranking of the logical block addresses in the second submission queue according to the heat of the data corresponding to each of the logical block addresses in the first submission queue, wherein the higher the heat of the data corresponding to the logical block address, the higher the priority of the ranking of the logical block address in the second submission queue.

19. The method of claim 16, wherein before the determining, by the second processor, the level of the amount of drift corresponding to each of the logical block addresses according to the heat of the data corresponding to each of the logical block addresses in the first submission queue, the method further includes:

determining, by the second processor, the heat of the data corresponding to each of the logical block addresses in the first submission queue through querying a mapping table.

20. The method of claim 15, wherein the sending, by the third processor, the read command to the non-volatile memory device according to the level of the amount of drift corresponding to each of the logical block addresses in the second submission queue includes:

determining, by the third processor, a read voltage for performing an operation of the read command on the non-volatile memory device according to the level of the amount of drift corresponding to each of the logical block addresses in the second submission queue; and sending, by the third processor, the read command to the non-volatile memory device according to the read voltage for performing the operation of a read command on the non-volatile memory device.

\* \* \* \* \*